Jan. 6, 1953    A. J. FISCHER ET AL    2,624,704
SEWAGE TREATMENT
Filed June 20, 1950    2 SHEETS—SHEET 1

INVENTOR:
Anthony J. Fischer &
Wayne A. Kivell,
BY Arthur Middleton
ATTORNEY

Jan. 6, 1953 A. J. FISCHER ET AL 2,624,704
SEWAGE TREATMENT
Filed June 20, 1950 2 SHEETS—SHEET 2
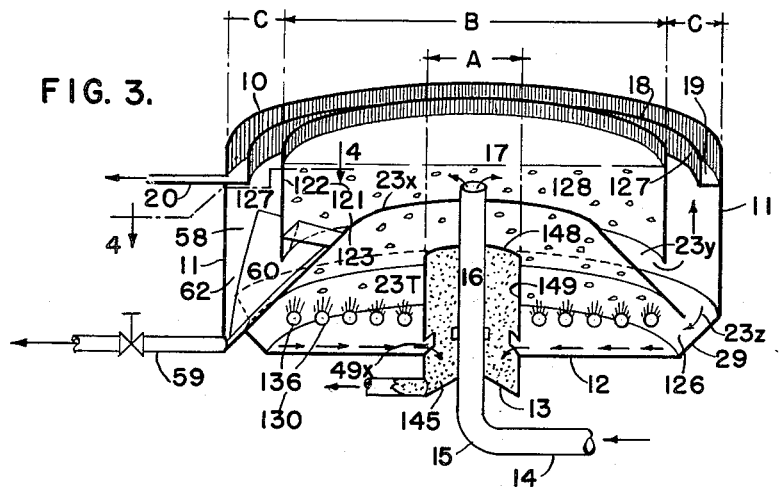
FIG. 3.
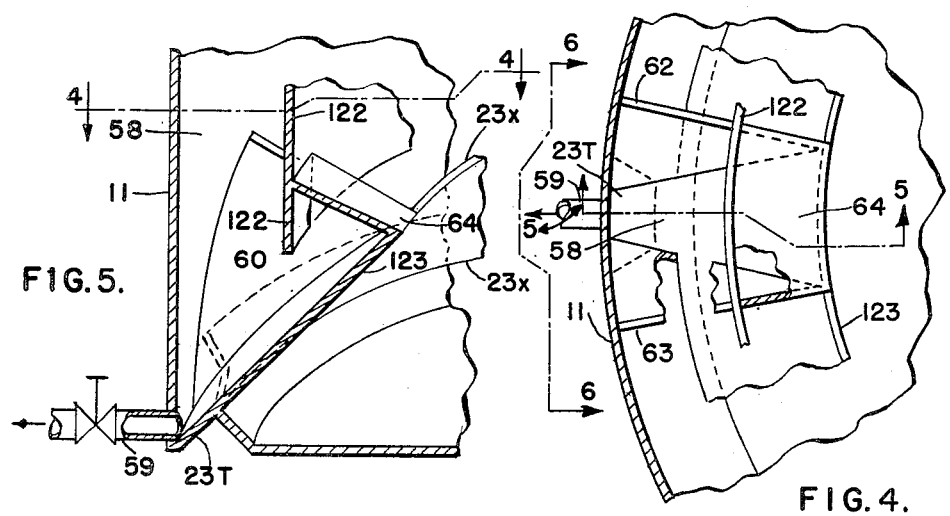
FIG. 5.
FIG. 4.
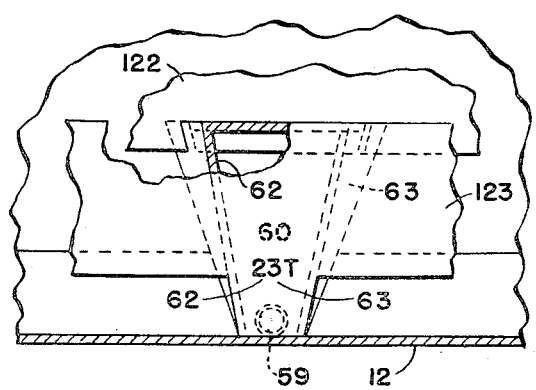
FIG. 6.
INVENTOR:
Anthony J. Fischer &
Wayne A. Kivell,
BY
Arthur Middleton
ATTORNEY Patented Jan. 6, 1953

2,624,704

UNITED STATES PATENT OFFICE 2,624,704

SEWAGE TREATMENT

Anthony J. Fischer, Manhasset, and Wayne A. Kivell, Bronxville, N. Y., assignors to The Dorr Company, Stamford, Conn., a corporation of Delaware Application June 20, 1950, Serial No. 169,142

10 Claims. (Cl. 210—8)

This invention relates to apparatus for the treatment of polluted turbid liquids such as sewage and similar trade-waste liquids that are to be clarified and to be purified at least to some extent. One object of the invention is to devise a combination aerator or activator and clarifier wherein aeration of the polluted liquid can take place followed by secondary clarification to practice the activated sludge process in a single tank unit. Another object of the invention is to devise a tank wherein the following functions can take place in automatic sequence, namely, primary or preliminary clarification, sludge-activating aeration, and secondary clarification. Another object is to devise such a tank having combined functions of aeration and secondary clarification wherein sludge of aerated sedimented solids or activated sludge, as such may be called, is automatically returned to the aeration compartment by gravity.

These objects and possibly others that may appear as this specification proceeds, are accomplished in an embodiment of this invention which may be described (perhaps with less definiteness than in the claims) as comprising a tank having side-walls, a bottom with a sludge outlet or discharge leading therefrom, a feed conduit for incoming polluted or raw liquid adapted for emission of such feed into the central portion of the tank, a clarified liquid effluent or overflow from the upper peripheral part of the tank, and sediment- or sludge-impelling raking blade structure for raking sludge over the bottom of the tank to the discharge with air-diffusing means supported from the rake structure. In such an environment, the invention is characterized by a baffled arrangement whereby there is an aeration compartment or zone centrally of the tank that is surrounded by a quiescent sedimentation compartment or zone. These compartments are in hydraulic communication through a throat provided by the baffled arrangement but which also minimizes migration of agitative forces in the aeration compartment from disturbing significantly the quiescence of the sedimentation compartment while yet permitting suspended solids in the sedimentation compartment to settle and collect as sludge. Such sludge flows by gravity from the sedimentation compartment to the aeration compartment due to the shape of the latter and the positioning of the sludge outlet from the bottom of the sedimentation compartment to be above but delivering onto the bottom of the aeration compartment of the tank. Another feature of novelty of the invention lies in the provision of an open-topped drum, shell, or pocket-member coaxially positioned in the tank and is adjacent to a conduit that delivers incoming raw liquid into the aeration compartment of the tank. The shell is spaced from that conduit and terminates at an elevation below the terminal end of the conduit whereby heavier solids suspended in the emitted raw feed that settle quickly are caught within the shell. They descend in this shell in the form of sludge which is thickened in the bottom section of the shell as they discharge to and through the sludge-discharge of the tank. This shell has inlet ports at substantially the level of the bottom of the aeration compartment so that sludge raked over that bottom to discharge, discharges through those ports into the shell to be mixed with sludge already descended thereinto from the emitted raw feed liquid. Other features of novelty are the auxiliary means for removing excess settled activated sludge directly to discharge from the sedimentation compartment; and the positioning of the air diffusing elements with particular respect to their supporting travelling sludge-impelling structure.

As illustrative of certain different embodiments of apparatus in the fields to which this invention relates, reference is made to the accompanying drawings constituting a part of this specification in which drawings:

Figs. 1 and 2 respectively constitute a vertical sectional view and a plan view partially broken away of a preferred form of combined aerating and clarifying apparatus for realizing the invention hereof.

Fig. 3 is a diagrammatic view, with sludge-raking parts and their supports omitted, illustrating a form of invention in which a combined aerating and clarifying apparatus may be embodied for realizing the invention hereof.

Figs. 4, 5 and 6 are fragmentary views illustrating certain details of construction employed in the apparatus diagrammatically illustrated by Fig. 3. Said Figs. 4, 5 and 6 are views of certain details illustrated at a larger scale that that of the corresponding parts shown in Fig. 3.

Fig. 4 is a horizontal sectional view taken on line 4—4 of Fig. 3 or lines 4—4 of Fig. 5.

Fig. 5 is a vertical sectional view taken on line 5—5 of Fig. 4, certain parts of Fig. 5 being broken away to show more clearly features of construction of parts underlying the broken away sections.

Fig. 6 is a vertical side view taken on line 6—6 of Fig. 4; in this Fig. 6 certain of the parts in the forepart thereof are broken away to more clearly bring out certain details of the parts within the confines of the tank as determined by the upstanding marginal wall of the tank.

Figure 1:
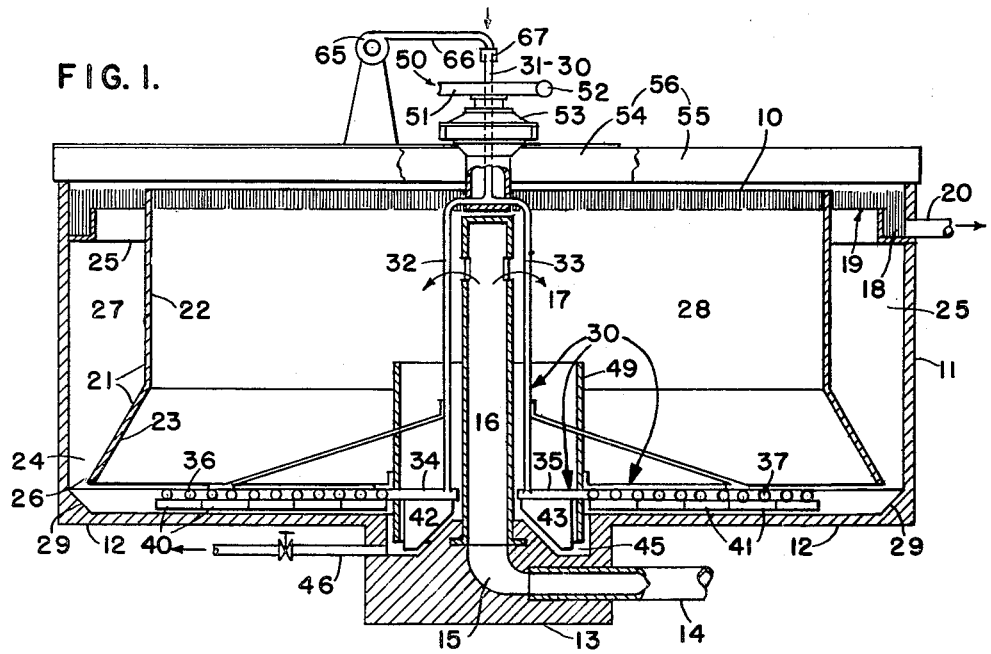
Figure 2:
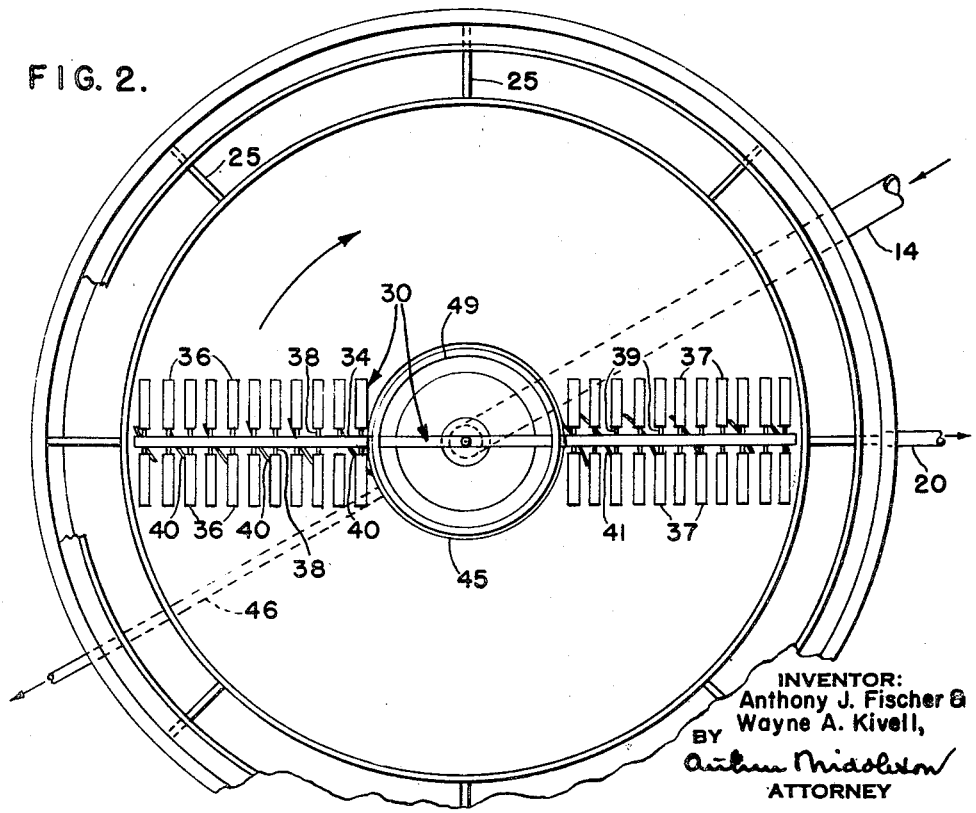

Reference is now made to the drawings in detail:

In Figs. 1 and 2 there is shown a treating tank 10 having a marginal wall 11, a bottom 12 and a low central section 13. The tank also has a feeding supply means embodying a low conduit 14, a curved conduit section 15 extending from the forward end of the conduit 14 and a riser tubular section or discharge member 16 having flow discharge or emission passage area 17. Incoming material, such as sewage to be treated, is supplied through the conduit 14 and is ultimately delivered or emitted through the passage area 17 into the upper interior portion of the tank. The tank has an effluent launder 18 with an overflow weir edge 19 that determines the normal operating surface level of the liquid undergoing treatment within the tank. Clarified liquid overflowing this edge passes into the effluent launder 18 and is ultimately discharged from the tank by means of the outflow conduit 20 leading from the launder.

Within the tank there is a partial partitioning or shield means 21 which as shown has an upwardly-extending cylindrical baffle 22 rising to an elevation higher than that of the overflow weir edge 19, and a low end extending downwardly well into the tank. This partial partition also has an outwardly and downwardly flaring bell portion 23 the lower end of which terminates proximate the floor or bottom 12 of the tank and also close to the inner surface 24 of the marginal wall 11 of the tank. In the preferred arrangement the shield member or partial partitioning means 21 thus provided is supported from the marginal wall of the tank through the means of radially extending uprights 25 uniformly spaced with respect to each other. These uprights 25 which in plan are shown as being eight in number are carried from the marginal wall 11 and in turn support the circular portions 22 and 23 above referred to. The result of the construction just described is an annularly narrow passageway or throat 26 and a rising secondary outer annular clarification or sedimentation zone 27 that is located so as to surround the partial partitioning means 21 which is circular in plan. That portion of the apparatus which is within the partial partitioning means 21 is designated as 28 and constitutes the major portion of the interior of the tank and may be viewed as an agitated aeration zone or compartment. The low edge of this partial partition 21 overlies an inwardly and downwardly sloping portion 29 extending from the inner surface 24 of the marginal wall and the floor or bottom 12 of the tank. This sloping surface serves to direct sediment from the annular clarification zone onto the floor 12 of the aeration compartment. It is in this treating zone 28 or aeration compartment where the incoming feed material is initially received as it is delivered from the discharge area 17 of the riser 16. This zone serves as an aerating region wherein the liquid fed for treatment has carried out thereupon the aeration and oxidation of organic matter held in solution and suspension to reduce the biological oxygen demand contained in the feed and agglomerate the solids carried in suspension by activation of a character according to which the feed is so treated as to realize a partial or substantially complete activated sludge. The aerating instrumentality by which such aeration is attained is collectively designated as 30.

In this connection it is to be noted that the marginal wall 11 of the tank supports a pair of transversely-extending beams 54 and 55 constituting part of a superstructure 56. On this superstructure there is carried a motivated mechanism collectively designated 50, and which is constructed for supporting the aerating mechanism collectively designated 30 and for turning the latter about a vertically-extending axis concentric with the marginal wall of the tank. This aerating mechanism 30 is supplied with air under pressure as through the medium of an aerating pump 65 supported in any suitable manner and piping 66 extending from the pump and embodying a swivel connection 67 operatively associated with a turnable tubular section 31 of the aerating means 30. This tubular section 31 is mounted on a turnable carrier member 51 which is driven in any suitable manner as from a motivated driving member 52. A casing member 53 is directly carried by the supporting beams 54 and 55 and in turn provides guiding support for the turnable carrying member 51 and the tubular pipe section 31. The turnable carrier member 51 may be in the form of a spur gear or bull wheel which is actuated through the medium, for example, of a motor-actuated worm 52.

The tubular section 31 has branching therefrom depending tubular pipe sections 32 and 33 located outside of the riser or feed-discharge member 16 as the riser may be called. From the lower portion of these tubular pipe sections 32 and 33 there extend in a radial outward direction pipes 34 and 35 which may be viewed as air distributor pipes which also serve as rake-carrying arms. It is realized that in some designs for structural reasons separately trussed structural arms may be used to carry the air supply pipes or ducts 34 and 35. In this case also a center cage or drum would be hung from turnable carrier member 51. From the pipes or arms 34 and 35 there horizontally extend at right angles thereto porous air-diffuser-elements or members 36 and 37. As to the air-diffuser-elements or members 36 and 37, each is in the form of a closed and porous tube or porous bottle and they are carried from the distributor pipes 34 and 35 as through the medium of tubular connections 38 and 39. The horizontal distributor pipes 34 and 35 which also serve as rake arms carry and have depending therefrom rake members 40 and 41 which are disposed and shaped so that as the aerating mechanism turns in a clockwise direction about a vertically-extending axis there is effected an impelling and progressive transfer of sedimented solids in the bottom of the main tank towards and into sludge-receiving sump or trench 45 provided in a depressed portion of the low central section 13 of the tank structure.

This annular space or trench 45 is really a sediment-receiving sump from which settled solids transferred thereinto can, at the will of an operator, be passed to a region outside of the tank as through the medium of a valve-controlled pipe or sediment-discharge conduit 46.

In connection with this construction, it will be noted that an open-topped drum or shell or pocket member 49 (which in this embodiment turns with the pipes 34 and 35) is provided for receiving quick settling solids and is embodied as in the form of an open-top drum, shell or substantially circular baffle that is carried by the air distributing and rake-carrying arms or pipes 34 and 35, or supported from a center cage or drum hung from turnable carrier member 51. This pocket member 49 is positioned so that the lower portion thereof extends downwardly within the sump 45 in a manner whereby a descending passage area is left between the outer portion of the pocket member and the interior of the marginal portion of the structure defining the annular sump 45. In some instances, the pocket member 49 may have its lower portion terminate at about the level of the porous air-diffuser elements members 36 and 37. This descending passage area receives sediment, embodying aerated or activated sludge, which is raked inwardly from the floor 12 and which after passing through the descending passageway can be transferred ultimately from the tank by means of the discharge conduit 46.

The pipes or rake-carrying arms 34 and 35 have depending therefrom rakes or sediment conveying blades 40 and 41 which are provided for progressively conveying or impelling sedimented solids or sludge from the floor 12 into the sump or trench 45.

There are also carried by the pipes or arms 34 and 35 depending sludge thickening blades 42 and 43 that are located within the pocket member 49 and which blades can be relied upon not only to thicken sludge therein but to aid in the transfer of such sludge, that includes solids that have settled into and within the pocket 49, to a region whereat such thickened sludge can be discharged through the pipe or conduit 46.

It is to be noted that this pocket member 49 surrounds the riser or feed-discharge pipe 16, is concentric therewith and is located whereby it receives quantities of the faster settling solids that settle quickly from the feed material directly thereinto. Thus, it may be said to comprise a primary settling zone.

It will also be noted that all of the readily settleable solids do not settle directly into the pocket 49 that a quantity of them, together with slower settling suspended solids, passes outwardly while in suspension into the aerating zone or compartment 28 wherein all such solids in suspension receive aeration or activation treatment while undergoing delayed sedimentation within said compartment. It is the sediment of aerated or activated solids that is progressively conveyed by the rakes 40 and 41 into the sump or trench 45.

In connection with the apparatus thus far described, it is to be observed that the zone 28 may be considered, and properly so, as an aerating zone. There is adequate means provided by the actuated or motivated mechanism collectively designated as 50 for effectively turning an aerating and raking mechanism that is functionally disposed for operating in the lower interior portion of the zone. The incoming feed material to be treated and which is delivered into the upper central portion of the tank encounters bubbles of rising air from the air-diffusing elements 36 and 37. This mode of supplying the diffused air realizes progressive agitation. These operations as thus carried out and the detention period of liquid undergoing treatment within the tank is such that the requisite aeration or activation of the organic matter of the feed be accomplished. The result attained is the oxidation of organic matter introduced as feed into zone 28 and the agglomeration of suspended matter into settleable solids in the presence of previously activated sludge. In the collection and removal of solids, some are obtained as quickly settled solids received directly in the open-top drum, shell or pocket member 49 while the other slower settling solids settling from the surrounding aerating regions are obtained as raked sediment passed into the annular trench or sump 45 from which the several types of settled solids are withdrawn as intermingled or mixed sludge through the medium of the sediment-discharge conduit 46.

While the aerating operation is taking place there is a progressive passing or migration of aerated liquid suspension through the annular narrow passageway or throat 26 from the agitated aeration zone 28 into the outer clarification zone 27 wherein the slower settling solids drop out or settle leaving a clarified supernatant which overflows the weir edge 19 and ultimately leaves the tank through the outflow conduit 20. This outer annular sedimentation or clarification zone 27 is relatively quiet because it is shielded from the agitative turbulence of the aeration zone or compartment 28 by means of the partial partitioning baffle 21.

As to the diagrammatically illustrated construction of Figs. 3 to 6 inclusive this indicates a modified form (from which the rotating or travelling pipes, arms, and raking blades have been omitted for thus making illustration easier) which can be employed for realizing important features of the invention hereof.

In this form there is a tank 10 having a marginal wall 11, a tank bottom 12, a low central section 13, and an annular sloping portion between the lower edge section of the marginal wall and the tank bottom for providing an inwardly and downwardly sloping floor portion 29 of the tank.

The tank has an effluent launder 19 provided with an overflow weir edge 18 that determines the normal surface level of the body of liquid undergoing aeration or aerobic activation treatment within the tank. An effluent conduit 20 conducts treated liquid passing as clarified effluent from the tank.

A feed supply means leads into the tank and embodies a low conduit 14, a curved conduit section 15 and a rising tubular member or riser 16 having a flow discharge or emission area 17 at elevation somewhat lower than that of the weir overflow edge 18 but substantially higher than that of the upper edge 148 of an open-top pocket, drum or shell member 149.

The interior of the tank is divided by a partial partitioning means 121 into a centrally located agitated aeration zone or compartment 128 and a surrounding quiescent clarification zone 127. In this connection it is to be noted that the aeration zone 128 is of larger volumetric capacity than that of the clarification zone or compartment 127.

The partial partitioning means 121 for shielding the clarification zone from the agitation in the aeration zone is effectively provided by an upwardly-extending cylindrical baffle 122 and by an annular downwardly and outwardly flared member 123. As to the cylindrical member 122 the upper edge thereof rises to an elevation higher than that of the overflow weir edge 18 and the lower edge is located a distance substantially downwardly within the tank, namely at an elevation approximately as low or even lower than that of the upper edge 148 of the open top pocket member 149 which it will be noted is centrally located with respect to the marginal wall 11 of the tank. As to the flaring member 123 this is positioned so that its upper end 23X extends within the lower portion of the cylindrical member 122, so that there is left between them a passageway or throat 23Y which is substantially annular in plan, and so that the lower end 23Z terminates over but is spaced from the downwardly and inwardly sloping surface 29 of the tank whereby there is left a passageway 126 which is substantially annular in plan.

The partial partitioning means constituent members 122 and 123 derive support from the tank as through the medium of uprights 125 carried by and extending radially inwardly from the marginal wall of the tank.

The elevation of the upper edge 23X is lower than that of the flow discharge passage area 17 of the riser 16.

An aerating means generally designated as 130 is employed for supplying the air for aeration into the lower portion of the aerating zone or compartment 128. This aerating means 130 essentially embodies air-diffusing elements 136 provided as by porous air-diffusion elements in the form of bottle-shaped or closed-end tubular members. The air-diffusing elements are provided with suitable means for supporting them for properly functioning within the tank. They may be supported so as to be fixedly positioned with respect to the tank or so as to be turnably supported with respect to the tank, to wit, according to the teaching outlined with respect to the form of apparatus of Figs. 1 and 2, the important factor being that the air-diffusing means distributes the air in a manner whereby the desired aerating or activation can be realized within the aeration zone 128.

Referring now to the pocket member 149, it will be noted that this is concentric with the riser 16, that it extends down below the floor surface of the tank bottom 12, that it rises part way within the outwardly flaring portion member 123, and that it provides a sediment-receiving trench or sump 145 from which sedimented or settled solids in the form of sludge can be passed at the will of an operator as through a valve-controlled discharge conduit 46.

This pocket member has sediment-transfer passageways 49X leading thereinto. These passageways permit a direct transfer of settled solids or sludge from the floor of the tank bottom 12 into the pocket 149.

This pocket also receives quickly settleable solids that gravitate directly thereinto from the incoming feed or overlying liquid undergoing treatment within the treating zone 128.

The tank as constructed has a marginally disposed sediment collecting hopper 60 serving as an auxiliary hopper for receiving a quantity of fine activated solids settling thereinto from a localized section of the clarification zone 127. This hopper is provided by side members 62 and 63 and a partial cover member 64 extending between the side members 62 and 63 on the one hand and on the other a portion of the cylindrical partial partitioning member 122 and the downwardly and outwardly flaring partial partitioning member 123.

The hopper is open at the top region 58 between the cylindrical partial partitioning member 122 and the marginal wall 11 of the tank. This hopper is provided with a valve-controlled discharge conduit 59 for passing the inevitable excess of activated sludge directly from the tank rather than have all the activated sludge be recirculated into and through the tank. In order that the bottom of the hopper may be completed a projecting portion 23T is provided as an extension of 123.

In Fig. 3 the arrow A indicates the extent of the primary settling and thickening pocket 149; the arrow B, the agitated aeration zone 128; and the arrow C the annular sedimentation zone 127.

We claim:

1. Apparatus for the treating of polluted turbid liquids which includes a tank for holding a body of such liquid and having a bottom providing a sediment-receiving sump in the central portion thereof and a surrounding sediment-receiving floor section; a marginal wall symmetrical in plan rising from said bottom; a clarified effluent overflow means at the upper portion of said marginal wall determining the normal surface level of the body of liquid undergoing treatment within the tank; a clarified liquid outflow means leading from said overflow means to a region outside of said tank; a sediment-discharge means leading from said sump to a region outside of the tank; a feed inflow conduit having a feed discharge section symmetrically located with respect to said marginal wall and disposed for submergedly and laterally discharging incoming feed liquid into the upper portion of the body of liquid undergoing treatment within the tank; an open-top and open-bottom shell symmetrical in plan and substantially concentric with respect to said feed discharge section and providing an initial receiving section for rapidly settling solids gravitating from the lateral discharge of incoming feed liquid because of said shell being of internal diameter substantially greater than that of the exterior dimension of the feed discharge section, the upper edge of which shell terminates at elevation substantially lower than that of the feed discharge section but at elevation substantially higher than that of the aforementioned sediment-receiving floor section, which said shell is supported and positioned with respect to said tank in a manner whereby said sediment-receiving sump has extent below the lower portion of the shell and whereby there is left and provided a restricted sediment transfer area leading from the surrounding sediment-receiving floor section of the tank bottom past the lower portion of said shell into said sediment-receiving sump; a baffle member providing a continuous partial partition symmetrical in plan, supported in spaced relationship and arranged with respect thereto so that the upper edge of the baffle member reaches to an elevation higher than the liquid surface level while the lower end of the baffle member reaches to a low elevation within the tank but terminates spacedly above the floor of the bottom of the tank, which said baffle divides the interior of the tank into an aeration compartment within the baffle member and a clarification compartment outside of said baffle member and within the marginal wall of the tank, which said aeration compartment is of large volumetric capacity as compared with that of said clarification compartment, there being left a passage area between the lower end portion of the baffle member and the lower interior portion of the tank whereby there is provided an outwardly located upflow transfer area for the passage of aerated liquid from the aeration compartment into the clarification compartment and whereby the same transfer area provides for the downward and inward movement of settling fine solids from the clarification compartment to and upon the aforementioned sediment-receiving floor section; air diffuser members disposed within the lower portion of the aeration compartment for distributively delivering air released therefrom throughout the lower region of said aeration compartment at elevation spacedly above said sediment-receiving floor section; means for supplying air under pressure to said air diffuser members; a bearing support member stationarily positioned with respect to the tank; a main support bearing mounted on said support member; a turnable bearing mounted on said main support bearing and located at elevation higher than that of said liquid surface level; motivated speed-reducing and power-transmission mechanism for imparting turning movement to said turnable bearing member about a vertically-extending axis substantially concentric with respect to said feed discharge section; and depending means deriving carrying support from said turnable bearing member and in turn carrying and supporting therefrom outwardly-extending rake-carrying arms equipped with sediment-engaging raking blades extending downwardly therefrom and provided for progressively impelling settled solids from diverse portions of the aforementioned sediment-receiving floor section to and into the aforesaid restricted sediment-transfer area leading from said sediment-receiving floor section past the low edge portion of the shell for ultimate reception within the sediment-receiving sump.

2. Apparatus according to claim 1 in which the air diffuser members are carried on and are turnable with the rake-carrying arms; in which the rake-carrying arms are hollow and constitute part of the pressure air-distributing means; and to which arms the air diffuser members are connected for receiving air distributively delivered thereinto from said arms.

3. Apparatus according to claim 1 in which the depending means providing support for the rake-carying arms are hollow, and in which these hollow arms constitute part of the means for supplying air under pressure to the air diffuser members.

4. Apparatus according to claim 1 in which the sediment-raking mechanism that includes the rake-carrying arms and the blades extending downwardly therefrom constitute part of the means for supplying air to the air diffuser members which latter are connected to and receive pressure air supplied thereto through the medium of hollow air-conducting pipes constituting part of the raking mechanism.

5. Apparatus according to claim 1 in which the open-top and open-bottom shell is connected to and is turnable with the rake-carrying arms.

6. Apparatus according to the claim 5 in which the rake-carrying arms are supported from downwardly-extending pressure-air-conducting tubular members constituting depending cage members the lower portions of which are located within the open-top and open-bottom shell, in which the rake-carrying arms derive support from said cage members and extend from within said shell to a region outside of the shell, which outwardly-extending rake-carrying arms are hollow and have an imperforate portion within the shell but have tubular air passage connection outside of the shell to the air diffuser members.

7. Apparatus according to claim 1 in which the baffle member providing the continuous partial partition has at and along the lower portion thereof a flaring section extending downwardly and outwardly, in which there is provided between the marginal wall and the sediment-receiving floor section underlying the aeration compartment a downwardly and inwardly sloping section for furthering the transfer of settled solids from within the clarification compartment downwardly towards and upon the floor of the aeration compartment.

8. Apparatus for the treating of polluted turbid liquids which includes a tank for holding a body of such liquid and having a bottom with a deep central section providing a centrally located annular sump and an outlying bottom section providing an annular sediment-receiving floor; a marginal wall rising from said outlying bottom section; a clarified effluent overflow means at the upper portion of said marginal wall determining the normal surface level of the body of liquid undergoing treatment within the tank; a clarified liquid outflow means leading from said overflow means to a region outside of the tank; a sediment-discharge means leading from said annular sump to a region outside of the tank; a feed inflow conduit having an inwardly and upwardly curved lower section located within the deep central section of the tank bottom and terminating in a tubular riser feed discharge section concentrically disposed with respect to said annular sump, which riser is provided with submerged feed discharge area at elevation somewhat lower than that of said liquid surface level; an open-top and open-bottom shell circular in plan and surrounding said riser, which shell has an internal diameter substantially greater than that of the exterior of the tubular riser feed discharge section and the upper end of which shell has an elevation substantially lower than that of the feed discharge section but substantially higher than that of the aforementioned annular sediment-receiving floor, said shell being supported in a manner and constructed whereby it reaches towards said annular sediment-receiving floor but is spacedly disposed with respect thereto so that there is left a restricted sediment-transfer area leading from said sediment-receiving floor towards and into said annular sump; a baffle member circular in plan and extending upwardly to an elevation higher than that of the liquid surface level and downwardly into the lower regions of the liquid holding portion of the tank but terminating spacedly above the tank bottom, which baffle member divides the interior of the tank into an aerating compartment lying within the baffle member and an annular clarifying compartment located between the outer portion of said baffle member and within the marginal wall of the tank, which annular clarifying compartment is of relatively small volumetric capacity as compared with that of the aerating compartment and which compartments are in constant hydraulic communication with each other through the medium of a passage area between the lower edge of the baffle on the one hand and the lower interior portion of the tank on the other hand; a bearing support member stationarily positioned with respect to the tank; a main supporting bearing mounted on said support member, a turnable bearing member mounted on said support member and located at elevation higher than that of said liquid surface level; motivated speed-reducing and power-transmission mechanism for imparting turning movement to said turnable bearing member about a vertically-extending axis concentric with respect to said riser pipe section; a cage member comprising descending air-conducting pipes supportable by and turnable with said bearing member; means for supplying air into and thence through said descending air pipes; tubular rake-carrying arms carried by, extending outwardly from and connected for receiving air supplied under pressure from said depending air-conducting pipes and whereby air from said pipes is progressively delivered into said rake-carrying arms; which said open-top and open-bottom shell is secured to and derives its support from said turnable rake-carrying arms, the portions of the tubular rake-carrying arms which are within said open-top shell being imperforate but those portions of the rake-carrying arms outside of said shell being provided with air-conducting openings and also provided with tubular connections extending outwardly from the arms; air diffuser elements secured in place to and with respect to said tubular rake-carrying arms through the medium of said tubular connections and from which diffuser elements air is distributively released into and throughout the lower portions of the body of liquid within the aforementioned aerating compartment; said rake-carrying arms having depending therefrom sediment-engaging raking blades for progressively impelling sedimented solids from diverse portions of the annular sediment-receiving floor underlying the aeration compartment and towards and into the restricted sediment-transfer area leading from said last-mentioned sediment-receiving floor into the centrally located annular sump; which said diffuser elements deliver the air that is distributively passed therefrom into that portion of the liquid within the aerating zone which is at elevation higher than that of the aforementioned sediment-engaging raking blades.

9. Apparatus for the treating of polluted turbid liquids which includes a tank for holding a body of such liquid and having a bottom with a deep central section providing a centrally located annular sump and a surrounding annular sediment-receiving floor section; a marginal wall rising from said floor; a clarified effluent overflow means at the upper portion of said marginal wall determining the normal surface level of the body of liquid undergoing treatment within the tank; a feed inflow conduit having a curved lower section leading into the deep central section of the tank bottom and terminating in a tubular riser feed discharge section concentrically disposed within and with respect to the aforesaid annular sump, which riser feed section is provided with a submerged feed discharge area at elevation somewhat lower than that of the liquid surface level; a clarified liquid outflow means leading from overflow means to a region outside of said tank; a sediment discharge means leading from said annular sump to a region outside of the tank; a bearing support member stationarily positioned with respect to the tank; a main supporting bearing mounted on said support member; a turnable bearing member mounted on said main supporting bearing and located at elevation higher than that of said liquid surface level; motivated speed-reducing and power-transmission mechanism for imparting turning movement to said turnable bearing member about a vertically-extending axis concentric with respect to said riser pipe section; a cage member comprising descending air-conducting pipes supported by and turnable with said bearing member; means for supplying air into and thence through said descending air pipes; an open-top shell circular in plan and surrounding said riser, which shell is of internal diameter substantially greater than that of the exterior of the riser pipe section and terminates at elevation substantially lower than that of the submerged feed discharge area of the riser conduit feed section but at elevation substantially higher than that of the aforementioned annular sediment-receiving floor section; tubular rake-carrying arms carried by, extending outwardly from and connected for receiving air supplied under pressure from said depending air-conducting pipes and whereby air from said pipes is progressively delivered into said rake-carrying arms, which said open-top shell is secured to and is supported by said tubular rake-carrying arms and extends outwardly therefrom into a region proximate but spacedly disposed with respect to the tank bottom whereby there is provided and left a restricted sediment-discharge area leading from the annular sediment-receiving floor portion of the tank into the sediment-receiving portion provided by the annular sump of the deep central section of the tank bottom, that portion of the tubular rake-carrying arms which is within said open-top shell being imperforate but that portion of the rake-carrying arms outside of said shell being provided with air-conducting openings and tubular connections extending outwardly therefrom, and secured to said arms through the medium of said tubular connections numerous air diffuser elements as in the form of porous tubes by and from which air is distributively released into and throughout the lower portions of the body of liquid within the region providing an aeration compartment outside of and surrounding said open-top shell; and a baffle member that is circular in plan, which is spacedly disposed within and suitably supported with respect to the marginal wall of the tank, the upper edge of which circular baffle reaches to an elevation higher than that of the overflow weir while the lower end of said baffle reaches to an elevation approximating that of the upper portion of said perforated tubes or bottles, the lower part of which baffle extends downwardly and outwardly and approaches the interior of the marginal wall of the tank but terminates short thereof; said rake-carrying arms also having depending therefrom raking blades constructed and disposed for progressively impelling sedimented material from diverse sections of the outlying circular floor areas towards and into the sediment transfer area provided between the tank bottom on the one hand and the lower portion of the open-top shell on the other hand.

10. A tank construction according to claim 9 in which there is an inwardly and downwardly extending sloping portion between the marginal wall of the tank and the circular sediment-receiving lower portion of the tank bottom whereby solids settling from the liquid within the tank and in the region outside of the baffle that is circular in plan can gravitate through a passage area leading from that region into that portion of the bottom of the tank that is served by said raking blades through which passage area aerated liquid from within an aeration zone that is marginally defined by the circular baffle can pass from the aeration zone through the passage area between the bottom of the baffle and the marginal wall into a clarifying zone provided between the baffle and the marginal wall.

ANTHONY J. FISCHER.
WAYNE A. KIVELL.

REFERENCES CITED

The following references are of record in the file of this patent:

UNITED STATES PATENTS

| Number | Name | Date |
| --- | --- | --- |
| 1,770,353 | Weber | July 8, 1930 |
| 2,477,459 | Kelly | July 26, 1949 |